(12) United States Patent
Anand et al.

(10) Patent No.: US 8,720,179 B2
(45) Date of Patent: May 13, 2014

(54) POWER PLANT INCLUDING AN EXHAUST GAS RECIRCULATION SYSTEM FOR INJECTING RECIRCULATED EXHAUST GASES IN THE FUEL AND COMPRESSED AIR OF A GAS TURBINE ENGINE

(75) Inventors: Ashok Kumar Anand, Niskayuna, NY (US); Thirumala Reddy Nagarjuna Reddy, Karnataka (IN); Jason Brian Shaffer, Glenville, NY (US); William David York, Greer, SC (US)

(73) Assignee: General Electric Company, Schenectady, NY (US)

( * ) Notice: Subject to any disclaimer, the term of this patent is extended or adjusted under 35 U.S.C. 154(b) by 446 days.

(21) Appl. No.: 13/269,356

(22) Filed: Oct. 7, 2011

(65) Prior Publication Data
US 2013/0086882 A1    Apr. 11, 2013

(51) Int. Cl.
*F02C 7/08* (2006.01)
*F02G 1/00* (2006.01)
*F02G 3/00* (2006.01)
*F02C 3/34* (2006.01)
*F02C 3/13* (2006.01)

(52) U.S. Cl.
CPC .... *F02C 3/34* (2013.01); *F02C 3/13* (2013.01)
USPC .......... 60/39.52; 60/39.182; 60/737

(58) Field of Classification Search
CPC ..................................... F02C 3/34; F02C 3/13
USPC .................. 60/39.5, 39.52, 39.182, 737
See application file for complete search history.

(56) References Cited

U.S. PATENT DOCUMENTS

| 3,792,581 | A | | 2/1974 | Handa | |
|---|---|---|---|---|---|
| 3,949,548 | A | | 4/1976 | Lockwood, Jr. | |
| 3,969,892 | A | | 7/1976 | Stettler et al. | |
| 4,147,141 | A | | 4/1979 | Nagano | |
| 4,271,664 | A | * | 6/1981 | Earnest | 60/39.181 |
| 5,595,059 | A | * | 1/1997 | Huber et al. | 60/780 |
| 6,202,400 | B1 | * | 3/2001 | Utamura et al. | 60/773 |
| 6,363,709 | B2 | * | 4/2002 | Kataoka et al. | 60/775 |
| 7,870,717 | B2 | | 1/2011 | MacKnight | |
| 8,051,638 | B2 | * | 11/2011 | Aljabari et al. | 60/39.52 |
| 8,365,537 | B2 | * | 2/2013 | Li et al. | 60/772 |
| 2006/0248882 | A1 | | 11/2006 | Tonetti et al. | |
| 2008/0309087 | A1 | | 12/2008 | Evulet et al. | |
| 2009/0284013 | A1 | | 11/2009 | Anand et al. | |
| 2010/0115960 | A1 | * | 5/2010 | Brautsch et al. | 60/772 |
| 2013/0327050 | A1 | * | 12/2013 | Slobodyanskiy et al. | 60/772 |
| 2013/0340404 | A1 | * | 12/2013 | Hughes | 60/39.52 |

OTHER PUBLICATIONS

U.S. Appl. No. 12/153,231, filed May 15, 2008.

* cited by examiner

*Primary Examiner* — William H Rodriguez
(74) *Attorney, Agent, or Firm* — Cantor Colburn LLP

(57) ABSTRACT

A power plant is provided and includes a gas turbine engine having a combustor in which compressed gas and fuel are mixed and combusted, first and second supply lines respectively coupled to the combustor and respectively configured to supply the compressed gas and the fuel to the combustor and an exhaust gas recirculation (EGR) system to re-circulate exhaust gas produced by the gas turbine engine toward the combustor. The EGR system is coupled to the first and second supply lines and configured to combine first and second portions of the re-circulated exhaust gas with the compressed gas and the fuel at the first and second supply lines, respectively.

20 Claims, 2 Drawing Sheets

POWER PLANT INCLUDING AN EXHAUST GAS RECIRCULATION SYSTEM FOR INJECTING RECIRCULATED EXHAUST GASES IN THE FUEL AND COMPRESSED AIR OF A GAS TURBINE ENGINE

FEDERAL RESEARCH STATEMENT

This invention was made with Government support under contract number DE-FC26-05NT42643 awarded by the Department of Energy. The Government has certain rights in this invention.

BACKGROUND OF THE INVENTION

The subject matter disclosed herein relates to a power plant and, more particularly, to a power plant including an exhaust gas recirculation (EGR) system to re-circulate a portion of exhaust gas produced by a gas turbine engine toward a combustor.

Oxides of nitrogen (NOx) are produced in a combustor of a gas turbine engine when a fuel is burned or oxidized with air from the turbine compressor, which normally includes an amount of oxygen that is larger than an amount required for the combustion. This excess of oxygen and high flame temperatures can generate NOx emissions. Gas turbine engine exhaust gas, as compared with air from the compressor, which is produced as a result of the combustion contains much less oxygen and high amounts of inert gases, such as nitrogen and carbon dioxide.

BRIEF DESCRIPTION OF THE INVENTION

According to one aspect of the invention, a power plant is provided and includes a gas turbine engine having a combustor in which compressed gas and fuel are mixed and combusted, first and second supply lines respectively coupled to the combustor and respectively configured to supply the compressed gas and the fuel to the combustor and an exhaust gas recirculation (EGR) system to re-circulate exhaust gas produced by the gas turbine engine toward the combustor. The EGR system is coupled to the first and second supply lines and configured to combine first and second portions of the re-circulated exhaust gas with the compressed gas and the fuel at the first and second supply lines, respectively.

According to another aspect of the invention, a power plant is provided and includes a compressor from which compressed gas is output along a first supply line, a second supply line configured to provide fuel for combustion, a combustor, coupled to the first and second supply lines, in which the compressed gas and the fuel are mixed and combusted, a turbine, receptive of products of the combustion for power generation, from which the combustion products are output as exhaust gas and an exhaust gas recirculation (EGR) system to re-circulate a portion of the exhaust gas toward the combustor. The EGR system includes a first conduit coupled to the first supply line by which a first portion of the re-circulated portion of the exhaust gas is combined with the compressed gas and a second conduit coupled to the second supply line by which a second portion of the re-circulated portion of the exhaust gas is combined with the fuel.

According to yet another aspect of the invention, a power plant is provided and includes a compressor from which compressed gas is output along a first supply line, a second supply line configured to provide fuel for combustion, a combustor, coupled to the first and second supply lines, the combustor including a premixer in which the compressed gas and the fuel are mixed to produce a mixture and a liner in which the mixture is combusted, a turbine, receptive of products of the combustion for power generation, from which the combustion products are output as exhaust gas and an exhaust gas recirculation (EGR) system to re-circulate a portion of the exhaust gas toward the combustor. The EGR system includes a first conduit coupled to the first supply line by which a first portion of the re-circulated portion of the exhaust gas is combined with the compressed gas, a second conduit coupled to the second supply line by which a second portion of the re-circulated portion of the exhaust gas is combined with the fuel, and a third conduit coupled to the premixer by which a third portion of the re-circulated portion of the exhaust gas is directed to the premixer.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains exemplary embodiments of the invention, together with advantages and features, by way of example with reference to the drawings.

DETAILED DESCRIPTION OF THE INVENTION

Combustion of high-hydrogen fuels, such as carbon-free synthetic gas (hereinafter referred to as "syngas"), in combustors of high-efficiency gas turbine engines may produce relatively high levels of thermal oxides of nitrogen (NOx) and is required to be controlled or reduced. Such reductions can be accomplished by mixing re-circulated cooled gas turbine engine exhaust in high-hydrogen or similar fuels and the primary combustion air.

Figure 1:
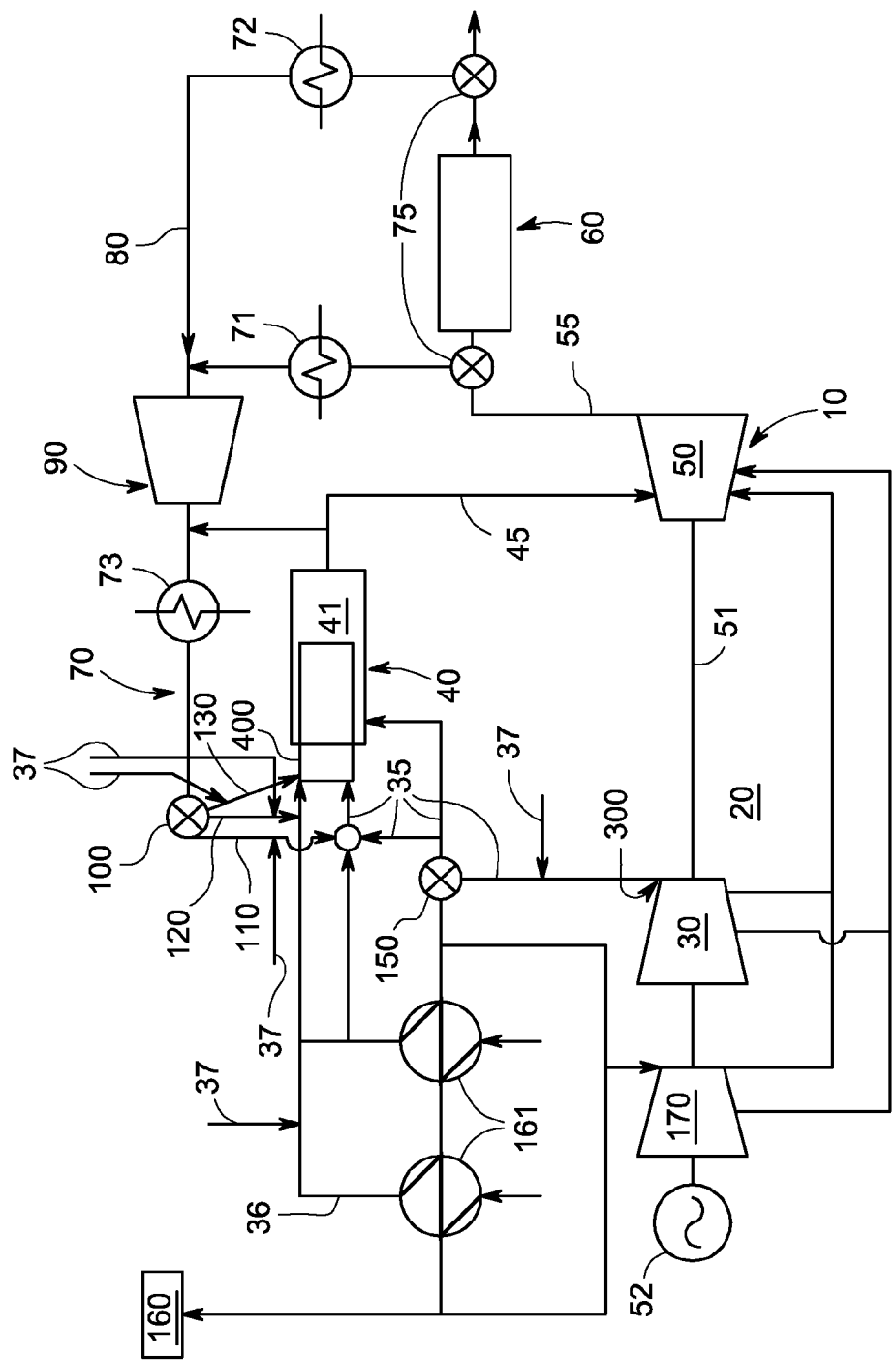
FIG. 1 is a schematic diagram of a portion of a power plant in accordance with embodiments.

With reference to FIG. 1, a power plant 10 is provided. The power plant 10 includes a gas turbine engine 20 to generate power and/or electricity from the production of high temperature fluids during combustion and an exhaust gas recirculation (EGR) system 70 that re-circulates exhaust gas produced by the gas turbine engine 20.

The gas turbine engine 20 includes a compressor 30, a combustor 40 and a turbine 50. The compressor 30 is configured to compress inlet gases and has an outlet 300 through which those compressed gases are output. A first supply line 35 is coupled to the outlet 300 of the compressor 30 whereby the compressed gases are output from the compressor 30 toward the combustor 40 along the first supply line 35. A second supply line 36 is provided and configured to provide fuel for the combustion.

The combustor 40 is operably coupled to the first supply line 35 and the second supply line 36 such that the combustor 40 is receptive of the compressed gas and the fuel. The combustor 40 is formed to define an interior 41 in which the compressed gas and the fuel are mixed and combusted to produce high temperature compressed fluids as products of the combustion.

Conduit 45 transports these high temperature compressed fluids to the turbine 50 such that the turbine 50 is receptive of the high temperature compressed fluids. The turbine 50 expands the high temperature fluids to turn the shaft 51, which enables power and/or electricity generation at the generator 52. The turbine 50 then outputs the expanded and relatively low temperature fluids as exhaust gas to conduit 55.

Where the power plant 10 is a combined cycle power plant, a heat recovery steam generator (HRSG) 60 may be disposed along the conduit 55. In such cases, the HRSG 60 is receptive of the exhaust gas and configured to generate steam from which power and/or electricity may be generated in a steam turbine.

The EGR system 70 is coupled to the conduit 55 by way of a first flow splitter 75 at a location that may be upstream or downstream from the HRSG 60. The EGR system 70 is configured to re-circulate a portion of the exhaust gas from the conduit 55 toward the combustor 40. To this end, the EGR system 70 includes an EGR conduit 80 along which the exhaust gas is transported and an EGR compressor 90, which is disposed along the EGR conduit 80 and configured to compress the exhaust gas prior to the exhaust gas being re-circulated back to the combustor 40. Heat exchangers 71, 72 and 73 may also be included and disposed along the EGR conduit 80 to cool the exhaust gas in the EGR system 70. Additional heat exchangers not shown in the drawings can also be provided.

The EGR system 70 further includes a second flow splitter 100 and first and second conduits 110 and 120. The first conduit 110 is coupled to the second flow splitter 100 and to the first supply line 35. The first conduit 110 transports a first portion of the re-circulated exhaust gas to the first supply line 35 whereby the first portion of the re-circulated exhaust gas may be combined with the compressed gas output from the compressor 30. The second conduit 120 is also coupled to the second flow splitter 100 and to the second supply line 36. The second conduit 120 transports a second portion of the re-circulated exhaust gas to the second supply line 36 whereby the second portion of the re-circulated exhaust gas may be combined with the fuel.

In accordance with one aspect, a type of the fuel supplied by the second supply line 36 may include, but is not limited to, at least one or more of natural gas, doped natural gas (i.e., natural gas mixed with a quantity of, for example, propane), liquid fuel, syngas and high-hydrogen fuel. In each case, respective magnitudes of the first and second portions of the re-circulated exhaust gas may be determined in accordance with the type of the fuel and/or a mode of operation of the power plant 10 (i.e., start-up, baseline, shutdown, etc.). In accordance with embodiments, a diluent stream 37 or portions thereof, which can be configured to carry a supply of diluent such as nitrogen, carbon dioxide or steam, may be added to the first supply line 35, the second supply line 36 and/or to any of the conduits of the EGR system 70 (i.e., first conduit 110 and second conduit 120 as well as third conduit 130 and fourth conduit 140, which are described below). This diluent stream 37 may be configured to provide diluent to the first supply line 35, the second supply line 36 and/or any of the conduits of the EGR system 70 to thereby reduce excess oxygen in the interior 41 of the combustor 40.

In accordance with further embodiments, the combustor 40 may include a premixer 400 in which the compressed gas and the fuel are mixed prior to being injected as a mixture into a combustion zone of the interior 41 of the combustor 40. The first and second conduits 110 and 120 are respectively coupled to the first and second supply lines 35 and 36 at respective locations upstream from the premixer 400. Also, the EGR system 70 may further include a third conduit 130 coupled to the second flow splitter 100 and to the premixer 400 such that the third conduit 130 transports a third portion of the re-circulated exhaust gas to the premixer 400 whereby the third portion of the re-circulated exhaust gas may be combined with the mixture of the compressed gas and fuel.

Figure 2:
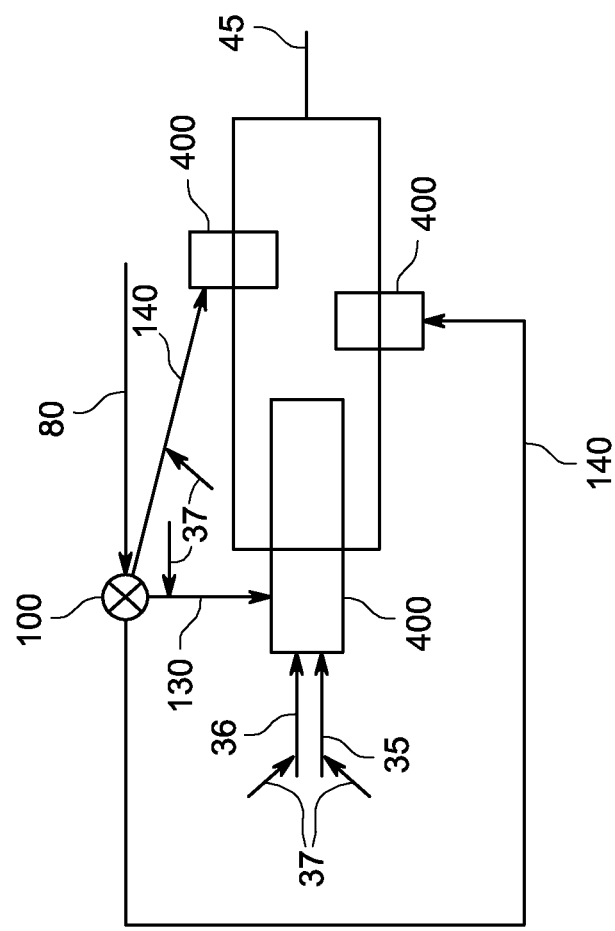
FIG. 2 is a schematic diagram of a combustor of the power plant of FIG. 1 in accordance with further embodiments.

With reference to FIG. 2 and, in accordance with further embodiments, the combustor 40 may include a plurality of premixers 400 at multiple axially spaced stages of the combustor 40 in which the compressed gas and the fuel are mixed prior to being injected as a mixture into the multiple axial stages of the combustion zone of the interior 41 of the combustor 40. In these embodiments, the EGR system 70 may further include fourth conduits 140, which are each coupled to the second flow splitter 100 and to respective ones of the plurality of the premixers 400. In this way, the fourth conduits 140 transport a fourth portion of the re-circulated exhaust gas to the plurality of the premixers 400 whereby the fourth portion of the re-circulated exhaust gas may be combined with the mixture of the compressed gas and fuel as described above.

With reference back to FIG. 1, a portion of the compressed gas output from the compressor 30 may be extracted from the first supply line 35 at third flow splitter 150. This extraction serves to account for the additional volume of the re-circulated exhaust gas being re-circulated by the EGR system 70 such that the turbine 50 is not overloaded. That is, a magnitude of the extracted portion being determined in accordance with a quantity of the re-circulated portion of the exhaust gas. As shown in FIG. 1, the extracted portion may be directed to one of an air separation unit 160 and/or an air expander 170. Where the extracted portion is directed to the air separation unit 160, the extracted portion may be first directed through heat exchangers 161 whereby diluent, such as nitrogen gas, and the fuel can be heated prior to each being respectively transported to the combustor 40. The heated diluent may be transported to the combustor 40 by way of the first supply line 35, the second supply line 36 and/or any of the conduits of the EGR system 70 as the diluent stream 37. Where the extracted portion is directed to the air expander 170, the extracted portion is expanded and used to generate coolant for the turbine 50 separately or in combination with extracted gas from the compressor 30.

As described herein, at least a portion of the compressed gas, which contains relatively high quantities of oxygen and which is output from the compressor 30, is replaced by at least a portion of the exhaust gas output from the turbine 50. Since the exhaust gas contains relatively low quantities of oxygen, the replacement decreases an amount of oxygen used by the combustor 40 without an appreciable increase in mass flow through the turbine 50. This results in reduced flame temperatures within at least the combustor 40 and corresponding reductions in the generated oxides of nitrogen (NOx).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power plant, comprising:
   a gas turbine engine having a combustor in which compressed gas and fuel are mixed and combusted;
   first and second supply lines respectively coupled to the combustor and respectively configured to supply the compressed gas and the fuel to the combustor; and
   an exhaust gas recirculation (EGR) system to re-circulate exhaust gas produced by the gas turbine engine toward the combustor,
   the EGR system being coupled to the first and second supply lines and configured to combine first and second portions of the re-circulated exhaust gas with the compressed gas and the fuel at the first and second supply lines, respectively.

2. The power plant according to claim 1, wherein respective magnitudes of the first and second portions of the re-circulated exhaust gas are determined in accordance with a type of the fuel.

3. The power plant according to claim 1, wherein the combustor comprises a premixer in which the compressed gas and the fuel are mixed.

4. The power plant according to claim 3, wherein the EGR system is coupled to the first and second supply lines upstream from the premixer.

5. The power plant according to claim 3, wherein the EGR system is further configured to direct a third portion of the re-circulated exhaust gas toward the premixer.

6. The power plant according to claim 1, wherein the combustor comprises premixers at multiple axial stages of the combustor in which the compressed gas and the fuel are mixed, the EGR system being further configured to direct fourth portions of the re-circulated exhaust gas toward at least one of the premixers at the multiple axial stages of the combustor.

7. The power plant according to claim 1, wherein a portion of the compressed gas is extracted from the first supply line.

8. The power plant according to claim 7, wherein a magnitude of the extracted portion is determined in accordance with a quantity of the re-circulated portion of the exhaust gas.

9. The power plant according to claim 8, wherein the extracted portion is directed to one or more of an air separation unit and an air expander.

10. The power plant according to claim 1, further comprising a diluent stream configured to provide diluent to the first and second supply lines and/or the EGR system.

11. A power plant, comprising:
    a compressor from which compressed gas is output along a first supply line;
    a second supply line configured to provide fuel for combustion;
    a combustor, coupled to the first and second supply lines, in which the compressed gas and the fuel are mixed and combusted;
    a turbine, receptive of products of the combustion for power generation, from which the combustion products are output as exhaust gas; and
    an exhaust gas recirculation (EGR) system to re-circulate a portion of the exhaust gas toward the combustor, the EGR system including:
    a first conduit coupled to the first supply line by which a first portion of the re-circulated portion of the exhaust gas is combined with the compressed gas, and
    a second conduit coupled to the second supply line by which a second portion of the re-circulated portion of the exhaust gas is combined with the fuel.

12. The power plant according to claim 11, wherein respective magnitudes of the first and second portions of the re-circulated portion of the exhaust gas are determined in accordance with a type of the fuel.

13. The power plant according to claim 11, wherein the combustor comprises a premixer in which the compressed gas and the fuel are mixed.

14. The power plant according to claim 13, wherein the first and second conduits are respectively coupled to the first and second supply lines upstream from the premixer.

15. The power plant according to claim 13, wherein the EGR system further includes a third conduit coupled to the premixer by which a third portion of the re-circulated portion of the exhaust gas is directed to the premixer.

16. The power plant according to claim 11, wherein the combustor comprises premixers at multiple axial stages of the combustor in which the compressed gas and the fuel are mixed,
    the EGR system further including fourth conduits respectively coupled to each of the premixers at the multiple axial stages of the combustor by which fourth portions of the re-circulated portion of the exhaust gas are directed to each of the premixers.

17. The power plant according to claim 11, wherein a portion of the compressed gas output from the compressor is extracted from the first supply line.

18. The power plant according to claim 17, wherein a magnitude of the extracted portion is determined in accordance with a quantity of the re-circulated portion of the exhaust gas.

19. The power plant according to claim 17, wherein the extracted portion is directed to one of an air separation unit and an air expander to produce coolant for the turbine.

20. A power plant, comprising:
    a compressor from which compressed gas is output along a first supply line;
    a second supply line configured to provide fuel for combustion;
    a combustor, coupled to the first and second supply lines, the combustor including a premixer in which the compressed gas and the fuel are mixed to produce a mixture and a liner in which the mixture is combusted;
    a turbine, receptive of products of the combustion for power generation, from which the combustion products are output as exhaust gas; and
    an exhaust gas recirculation (EGR) system to re-circulate a portion of the exhaust gas toward the combustor, the EGR system including:
    a first conduit coupled to the first supply line by which a first portion of the re-circulated portion of the exhaust gas is combined with the compressed gas,
    a second conduit coupled to the second supply line by which a second portion of the re-circulated portion of the exhaust gas is combined with the fuel, and
    a third conduit coupled to the premixer by which a third portion of the re-circulated portion of the exhaust gas is directed to the premixer.

* * * * *